(12) United States Patent
Hirose

(10) Patent No.: US 6,606,201 B1
(45) Date of Patent: Aug. 12, 2003

(54) ZOOM LENS SYSTEM

(75) Inventor: Masatoshi Hirose, Sakurai (JP)

(73) Assignee: Minolta Co., Ltd., Osaka (JP)

( * ) Notice: Subject to any disclaimer, the term of this patent is extended or adjusted under 35 U.S.C. 154(b) by 335 days.

(21) Appl. No.: 09/690,203

(22) Filed: Oct. 17, 2000

(30) Foreign Application Priority Data

Oct. 25, 1999 (JP) .......................................... 11-302945

(51) Int. Cl.[7] .................... G02B 15/14; G02B 15/177
(52) U.S. Cl. .............................. 359/686; 359/676
(58) Field of Search ........................ 359/683, 686, 359/698

(56) References Cited

U.S. PATENT DOCUMENTS

| | | | | |
|---|---|---|---|---|
| 3,918,798 A | * | 11/1975 | Takano | 359/683 |
| 5,257,129 A | * | 10/1993 | Morooka et al. | 359/432 |
| 5,671,993 A | * | 9/1997 | Shikama | 353/77 |
| 5,721,642 A | * | 2/1998 | Shibayama et al. | 359/686 |
| 5,914,820 A | | 6/1999 | Takimoto et al. | 359/686 |

FOREIGN PATENT DOCUMENTS

JP         10-020192 A         1/1998

* cited by examiner

Primary Examiner—Scott J. Sugarman
Assistant Examiner—Darryl J. Collins
(74) Attorney, Agent, or Firm—Sidley Austin Brown & Wood LLP

(57) ABSTRACT

A zoom lens system has, from an enlargement side to a reduction side, a first lens unit having negative optical power and succeeding lens units including at least two lens units having positive optical power, wherein in zooming, all of lens units having negative optical power and included in entire zoom lens system is stationary in zooming.

19 Claims, 3 Drawing Sheets

FNO=1.89
[T]
SPHERICAL ABERRATION AND SINE CONDITION

Y'=13.0
ASTIGMATISM

Y'=13.0
DISTORTION %

FNO=1.50
[W]
SPHERICAL ABERRATION AND SINE CONDITION

Y'=13.0
ASTIGMATISM

Y'=13.0
DISTORTION %

FNO=2.25

[T]

-0.1  0.1
SPHERICAL ABERRATION
AND SINE CONDITION

Y'=12.0

-0.1  0.1
ASTIGMATISM

Y'=12.0

-1.0  1.0
DISTORTION %

FNO=2.00

[W]

-0.1  0.1
SPHERICAL ABERRATION
AND SINE CONDITION

Y'=12.0

-0.1  0.1
ASTIGMATISM

Y'=12.0

-1.0  1.0
DISTORTION %

ZOOM LENS SYSTEM

RELATED APPLICATION

This application is based on application No. 11-302945 filed in Japan, the content of which is hereby incorporated by reference.

FIELD OF THE INVENTION

The present invention relates to a zoom lens system. More specifically, the present invention relates to a zoom lens system suitable for use as a projection optical system for a projector such as a liquid crystal projector that projects an image on a liquid crystal panel onto a screen, and an imaging optical system for a digital video camera and a digital still camera.

DESCRIPTION OF THE PRIOR ART

As zoom lens systems for projection, the following are known: a three-unit zoom type of negative, positive, positive configuration in which first and second lens units are moved for zooming (U. S. Patent No. 5,914,820, etc.); and a four-unit zoom type of negative, positive, negative, positive configuration in which second and third lens units are moved for zooming (Japanese Laid-open Patent Application No. 10-20192, etc.).

In these zoom types, it cannot be said that sufficient size reduction is achieved while optical performance necessary for projection zoom lens systems is satisfied. For example, in the type in which the first lens unit is moved for zooming like the former three-unit zoom lens system, the diameter of the first lens unit is apt to be large and when a focusing method in which one lens unit is moved out for focusing is adopted, the mechanical structure of the first lens unit is also large in the direction of the diameter. In the latter four-unit zoom type, since the second lens unit and the third lens unit are moved in opposite directions for zooming, space for movement is necessary for each of the second and third lens units. Provision of space for movement for each of the second and third lens units results in an increase in overall length.

SUMMARY OF THE INVENTION

An object of the present invention is to provide an improved zoom lens system.

Another object of the present invention is to provide a high-performance and compact zoom lens system.

These objects are achieved by a zoom lens system performing zooming by moving at least two lens units, wherein a stationary lens unit having negative optical power is disposed on the most enlargement side and the lens units moved for zooming include no lens unit having negative optical power.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Hereinafter, zoom lens systems embodying the present invention will be described with reference to the drawings. While the embodiments described below are zoom lens systems suitable for use as projection optical systems for projectors (for example, liquid crystal projectors), they are also suitable for use as imaging optical systems for imaging apparatuses (for example, video cameras).

Figure 1:
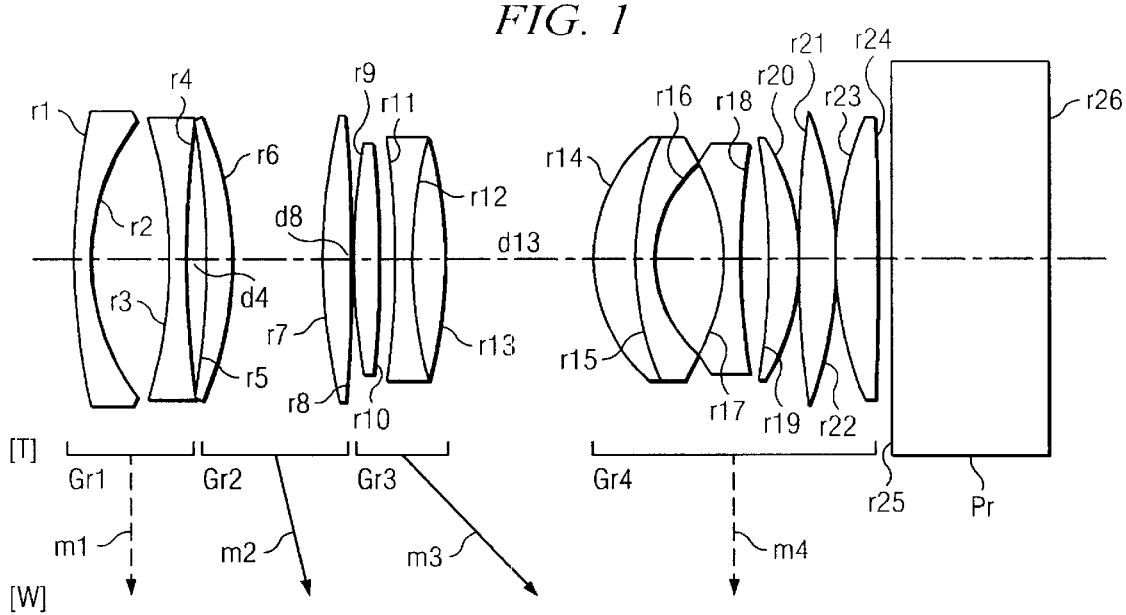
FIG. 1 shows a lens arrangement of a first embodiment (first example)
Figure 2:
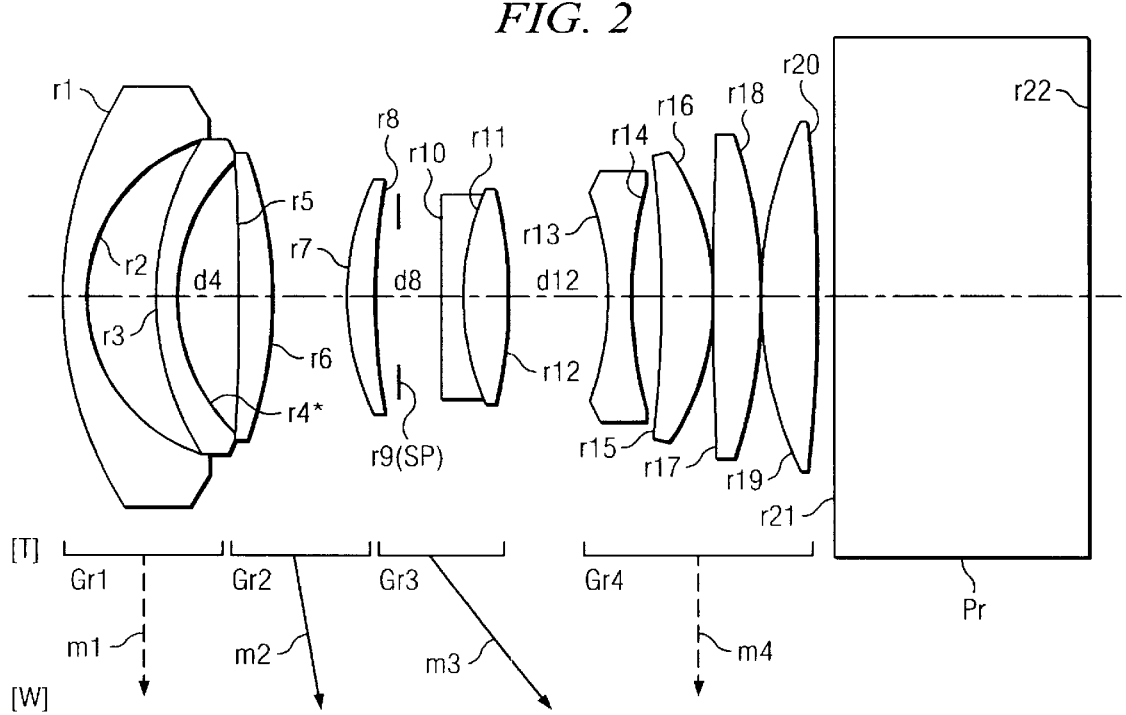
FIG. 2 shows a lens arrangement of a second embodiment (second example)
Figure 3A:
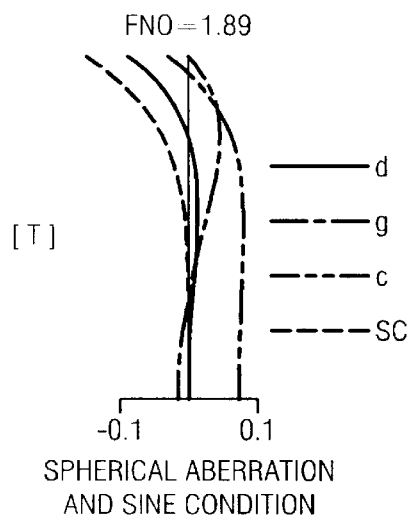
FIGS. 3(a) to 3(f) are graphic representations of aberrations of the first example.
Figure 3B:
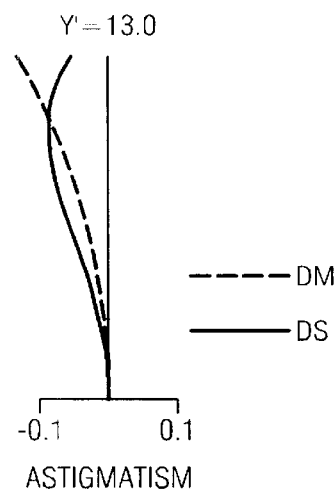
Figure 3C:
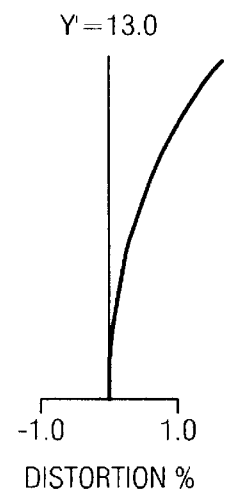
Figure 3D:
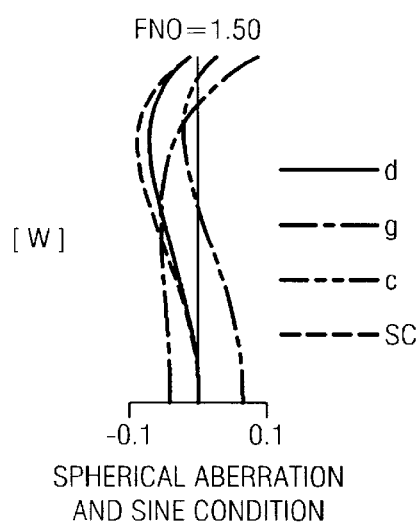
Figure 3E:
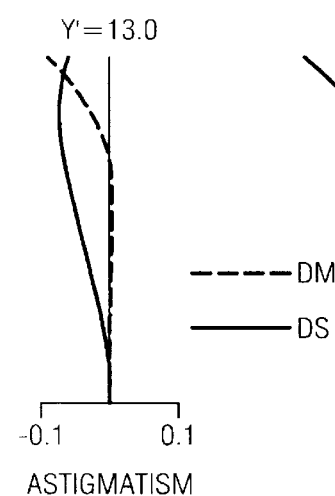
Figure 3F:
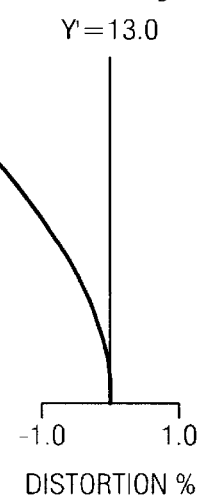
Figure 4A:
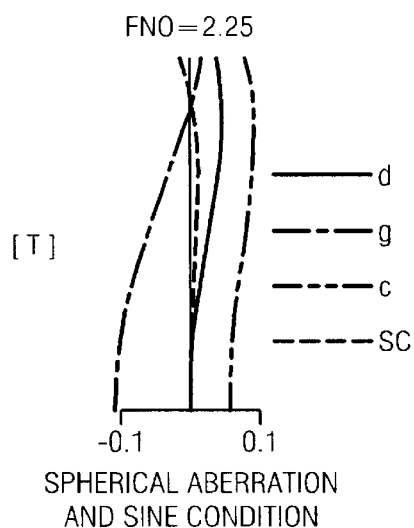
FIGS. 4(a) to 4(f) are graphic representations of aberrations of the second example.
Figure 4B:
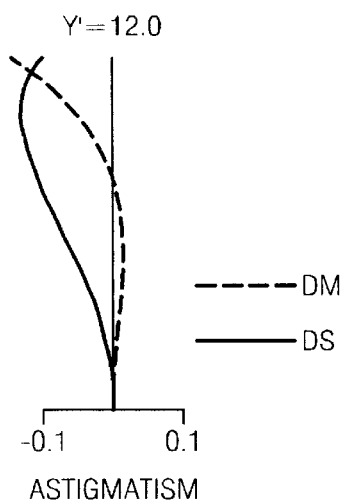
Figure 4C:
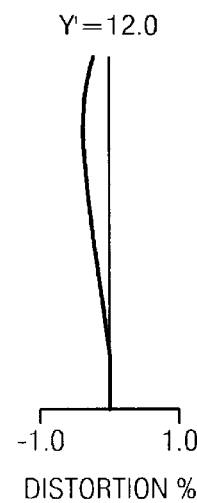
Figure 4D:
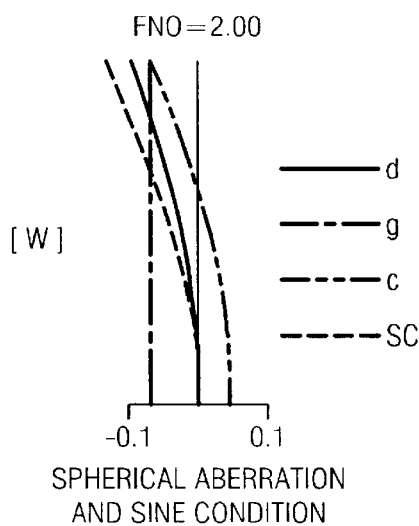
Figure 4E:
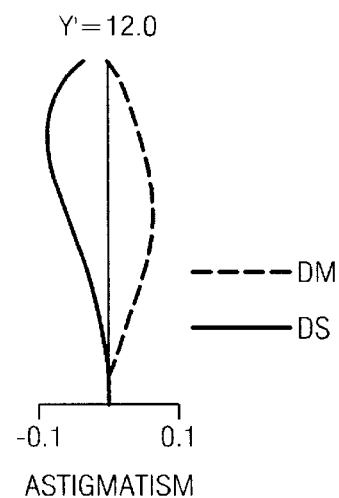
Figure 4F:
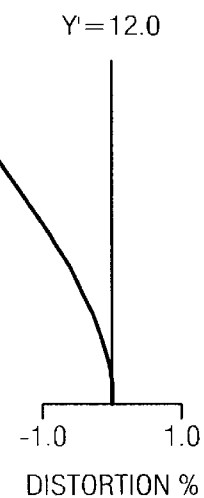

FIGS. 1 and 2 show lens arrangements, at the telephoto limit (longest focal length condition) [T], of zoom lens systems according to first and second embodiments. The arrows mj (j=1,2,3,4) in the figures each schematically show the movement of a j-th lens unit (Grj) in zooming from the telephoto limit [T] to the wide-angle limit (shortest focal length condition) [W], and the broken arrows m1 and m4 show that the lens units are stationary in zooming. In the figures, the surfaces designated by ri (i=1,2,3, . . . ) are the i-th surfaces counted from the enlargement side (that is, the projected side), and of the i-th unit-to-unit axial distances di(i=1,2,3, . . . ) counted from the enlargement side, the axial distances designated by di are variable in zooming.

The first and second embodiments are four-unit zoom lens systems each comprising from the enlargement side a first lens unit (Gr1) having negative optical power, a second lens unit (Gr2) having positive optical power, a third lens unit (Gr3) having positive optical power and a fourth lens unit (Gr4) having positive optical power. On the reduction side of the fourth lens unit (Gr4), a dichroic prism (Pr) being stationary in zooming is disposed. As zoom lens units, the first lens unit (Gr1) and the fourth lens unit (Gr4) are stationary lens units and the second lens unit (Gr2) and the third lens unit (Gr3) are movable lens units. By the zoom movements (m2 and m3), toward the reduction side, of the second lens unit (Gr2) and the third lens unit (Gr3), in zooming from the telephoto limit [T] to the wide-angle limit [W], the distance between the first lens unit (Gr1) and the second lens unit (Gr2) monotonically increases and the distance between the third lens unit (Gr3) and the fourth lens unit (Gr4) monotonically decreases. Focusing is performed, for example, by moving out the first lens unit (Gr1).

In the first embodiment (FIG. 1), the lens units comprise the following lens elements from the enlargement side: The first lens unit (Gr1) comprises a negative meniscus lens element concave to the reduction side and a bi-concave negative lens element. The second lens unit (Gr2) comprises a positive meniscus lens element convex to the reduction side and a bi-convex positive lens element. The third lens unit (Gr3) comprises a bi-convex positive lens element and a doublet lens element consisting of a bi-concave negative lens element and a bi-convex positive lens element. The fourth lens unit (Gr4) comprises a doublet lens element consisting of a positive meniscus lens element convex to the enlargement side and a negative meniscus lens element concave to the reduction side, a bi-concave negative lens element, a positive meniscus lens element convex to the reduction side and two bi-convex positive lens elements.

In the second embodiment (FIG. 2), the lens units comprise the following lens elements from the enlargement side: The first lens unit (Gr1) comprises two negative meniscus lens elements concave to the reduction side. The reduction side surface (r4*) of the reduction side meniscus lens element is aspherical. The second lens unit (Gr2) comprises a positive meniscus lens element convex to the reduction side and a positive meniscus lens element convex to the enlargement side. The third lens unit (Gr3) comprises a diaphragm (SP) and a doublet lens element consisting of a negative meniscus lens element concave to the reduction side and a bi-convex positive lens element. The fourth lens unit (Gr4) comprises a bi-concave negative lens element, a positive meniscus lens element convex to the reduction side and two bi-convex positive lens elements.

In the above-described embodiments, a stationary lens unit having negative optical power is disposed on the most enlargement side. Since the first lens unit (Gr1) having negative optical power is stationary in zooming, the diameter of the first lens unit (Gr1) can be reduced. Moreover, even when the focusing method in which one lens unit is moved out for focusing is adopted, the mechanical structure of the first lens unit (Gr1) is simplified and is reduced in size in the direction of the diameter. Consequently, a zoom lens system whose overall size in the direction of the diameter is small is obtained.

In general zoom lens systems, zooming is performed by moving at least two lens units (zoom lens units), and in the above-described embodiments, the lens units moved for zooming include no lens unit having negative optical power. That is, the second lens unit (Gr2) and the third lens unit (Gr3) which are movable lens units both have positive optical power. When zooming is performed by only movable lens units having positive optical power, the movable lens units are all moved in the same direction for zooming, so that less space is required for the movement. Consequently, a zoom lens system being small in overall length is obtained.

Moreover, the use of two or more movable lens units increases the degree of freedom of design, which is advantageous in design. Therefore, the two lens units, the second lens unit (Gr2) and the third lens unit (Gr3), are used as the movable lens units that are among the lens units succeeding the first lens unit (Gr1). As mentioned above, in the four-unit zoom type of negative, positive, negative, positive configuration in which the second and third lens units are moved for zooming, since the second and third lens units are moved in opposite directions for zooming, space for movement is necessary for each of the second and third lens units. On the contrary, in the four-unit zoom type of negative, positive, positive, positive configuration in which the second and third lens units are moved for zooming like the above-described embodiments, since the second lens unit (Gr2) and the third lens unit (Gr3) are moved in the same direction for zooming, their spaces for movement overlap. Since this reduces the overall space for movement necessary for the movable lens units, the overall length of the zoom lens system decreases.

In the four-unit zoom lens system of negative, positive, positive, positive configuration in which the first and fourth lens units (Gr1) and (Gr4) are stationary and the distance between the first and second lens units (Gr1) and (Gr2) monotonically increases and the distance between the third and fourth lens units (Gr3) and (Gr4) monotonically decreases in zooming from the telephoto limit [T] to the wide-angle limit [W] like the above-described embodiments, it is desirable that at least one of the following conditions (1) to (4) be satisfied and it is more desirable that all of the following conditions (1) to (4) be satisfied:

$$-2.0 < f1/fW < -1.1 \quad (1)$$

$$1.5 < f2/fW < 2.7 \quad (2)$$

$$2 < f3/fW < 6 \quad (3)$$

$$1.0 < f4/fW < 2.2 \quad (4)$$

where
fW is the overall focal length of the zoom lens system at the wide-angle limit [W],
f1 is the focal length of the first lens unit (Gr1),
f2 is the focal length of the second lens unit (Gr2),
f3 is the focal length of the third lens unit (Gr3), and
f4 is the focal length of the fourth lens unit (Gr4).

The condition (1) defines the optical power of the first lens unit (Gr1). When the lower limit of the condition (1) is exceeded, the optical power of the first lens unit (Gr1) is weak, so that the amount of movement of a lens unit when the lens unit is moved out for focusing is large. This increases variation in aberrations from infinity to proximity, so that it is difficult to balance performance at infinity and in proximity. When the upper limit of the condition (1) is exceeded, the optical power of the first lens unit (Gr1) is too strong, so that it is difficult to curb aberrations (particularly, distortion).

The conditions (2) and (3) define the optical powers of the second lens unit (Gr2) and the third lens unit (Gr3), respectively. When the lower limit of the condition (2) or (3) is exceeded, the optical power of the second lens unit (Gr2) or the third lens unit (Gr3) is too strong, so that it is difficult to curb aberrations. When the upper limit of the condition (2) or (3) is exceeded, the optical power of the second lens unit (Gr2) or the third lens unit (Gr3) is weak, so that the amount of movement for zooming increases. Consequently, the overall length increases, and the diameter of the first lens unit (Gr1) increases when the diaphragm is disposed in some position.

The condition (4) defines the optical power of the fourth lens unit (Gr4). When the lower limit of the condition (4) is exceeded, the optical power of the fourth lens unit (Gr4) is too strong, so that it is impossible to secure a sufficient lens back focal length. When the lens back focal length cannot be secured, it is impossible to dispose the dichroic prism (Pr) there. When the upper limit of the condition (4) is exceeded, the optical power of the fourth lens unit (Gr4) is weak, so that the lens back focal length is too large. Consequently, the overall length increases and the diameter of the fourth lens unit (Gr4) increases.

It is desirable to provide at least one aspherical surface in the first lens unit (Gr1) like the second embodiment. The second embodiment is a zoom lens system being considerably wider-angle than the first embodiment, and for zoom lens systems being this wide-angle, it is generally difficult to curb distortion. It is the aspherical surface in the first lens unit (Gr1) that effectively corrects the distortion. By using an aspherical surface in the first lens unit (Gr1), a wide angle can be achieved with distortion being excellently corrected. The use of an aspherical surface in the first lens unit (Gr1) is effective particularly in a projection system requiring a wide angle like a rear projector. By disposing an aspherical surface near the diaphragm (SP) in the second lens unit (Gr2) or the third lens unit (Gr3), spherical aberration, curvature of field and the like can be effectively corrected. By using an aspherical surface in the fourth lens unit (Gr4), curvature of field, coma aberration and the like can be effectively corrected.

While the lens units constituting the above-described embodiments include only refractive type lens elements that deflect the incident ray by refraction (that is, lens elements of a type in which the incident ray is deflected at the interface between media having different refractive indices), the present invention is not limited thereto. For example, the lens units may include a diffractive type lens element that deflects the incident ray by diffraction, a refraction-diffraction hybrid lens element that deflects the incident ray by a combination of diffraction and refraction, a gradient index lens element that deflects the incident ray by the distribution of refractive index in the medium, and the like.

Hereinafter, the constructions of the zoom lens systems embodying the present invention will be more concretely described with reference to construction data and the like. First and second examples shown below correspond to the above-described first and second embodiments, respectively, and FIGS. 1 and 2 showing the first and second embodiments illustrate the lens arrangements of the corresponding first and second embodiments, respectively.

In the construction data of the examples, ri (i=1,2,3, . . . ) is the radius of curvature (mm) of the i-th surface counted from the enlargement side, di (i=1,2,3, . . . ) is the i-th axial distance (mm) counted from the enlargement side, and Ni (i=1,2,3, . . . ) and ν i (i=1,2,3, . . . ) are the refractive index (Nd) and the Abbe number (ν d), to the d-line, of the i-th optical element counted from the enlargement side. In the construction data, the axial distances that vary in zooming are variable air spaces between the lens units at the telephoto limit [T], in the middle focal length condition [M] and at the wide-angle limit [W]. The overall focal lengths (f) and F numbers (FNO) of the lens system in these focal length conditions, and corresponding values of the conditions are also shown.

The surface marked with * at the radius of curvature ri is aspherical, and is defined by the following expression (AS) representing the configuration of an aspherical surface. Aspherical data is shown together with other data.

$$X(H) = (C \cdot H^2)/\{1+\sqrt{(1-\epsilon \cdot C^2 H^2)}\} + (A4 \cdot H^4 + A6 \cdot H^6 + A8 \cdot H^8 + A10 \cdot H^{10}) \quad (AS)$$

In the expression (AS),

X(H) is the amount of displacement in the direction of the optical axis at a height H (with the vertex as the reference), H is the height in a direction vertical to the optical axis, C is the paraxial curvature, $\epsilon$ is the conic constant, and Ai is the ith-order aspherical coefficient.

FIGS. 3(a) to 3(f) and 4(a) to 4(f) are graphic representations of aberrations of the first and second embodiments. FIGS. 3(a) to 3(c) and 4(a) to 4(c) show aberrations (from the left, spherical aberration and sine condition, astigmatism, and distortion; Y' represents the maximum image height) for a subject at infinity on the reduction side at the telephoto limit. FIGS. 3(d) to 3(f) and 4(d) to 4(f) show the aberrations at the wide-angle limit. In the graphic representations of spherical aberration, the solid line (d) represents spherical aberration to the d-line, the alternate long and short dash line (g) represents spherical aberration to the g-line, the chain double-dashed line (c) represents spherical aberration to the c-line, and the broken line (SC) represents the sine condition. In the graphic representations of astigmatism, the broken line (DM) represents astigmatism to the d-line on the meridional image plane, and the solid line (DS) represents astigmatism to the d-line on the sagittal image plane. In the graphic representations of distortion, the solid line represents distortion % to the d-line. When the examples are used for projectors (for example, liquid crystal projectors) as zoom lens systems for projection, although originally, the screen surface (projected surface) is the image surface and the display device surface (for example, the liquid crystal panel surface) is the object surface, the examples are constructed as reduction systems (for example, imaging optical systems) in optical design, and the optical performance is evaluated on the display device surface with the screen surface being regarded as the object surface.

1st Embodiment f=40.0[T]~35.0[M]~29.0[W]

FNO=1.89[T]~1.50[W]

Condition (1): f1/fW=−1.38

Condition (2): f2/fW=2.09

Condition (3): f3/fW=3.66

Condition (4): f4/fW=1.84

| [Radius of Curvature] | [Axial Distance] | [Refractive Index] | [Abbe Number] |
|---|---|---|---|
| r1 = 94.184 | | | |
| | d1 = 2.500 | N1 = 1.62041 | ν1 = 60.34 |
| r2 = 34.818 | | | |
| | d2 = 12.068 | | |
| r3 = −75.764 | | | |
| | d3 = 2.500 | N2 = 1.61800 | ν2 = 63.39 |
| r4 = 130.766 | | | |
| | d4 = 4.190~7.695~13.940 | | |
| r5 = −157.615 | | | |
| | d5 = 3.809 | N3 = 1.71700 | ν3 = 47.86 |
| r6 = −59.242 | | | |
| | d6 = 13.588 | | |
| r7 = 86.240 | | | |
| | d7 = 4.273 | N4 = 1.68893 | ν4 = 31.16 |
| r8 = −380.754 | | | |
| | d8 = 0.722~6.981~13.459 | | |
| r9 = 116.886 | | | |
| | d9 = 3.663 | N5 = 1.74400 | ν5 = 44.93 |
| r10 = −361.000 | | | |
| | d10 = 2.669 | | |
| r11 = −118.455 | | | |
| | d11 = 2.500 | N6 = 1.75520 | ν6 = 27.51 |
| r12 = 77.083 | | | |
| | d12 = 5.433 | N7 = 1.62041 | ν7 = 60.34 |
| r13 = −67.283 | | | |
| | d13 = 22.788~13.023~0.300 | | |
| r14 = 25.610 | | | |
| | d14 = 6.362 | N8 = 1.71700 | ν8 = 47.86 |
| r15 = 45.578 | | | |
| | d15 = 2.886 | N9 = 1.61293 | ν9 = 36.96 |
| r16 = 19.824 | | | |
| | d16 = 10.794 | | |
| r17 = −30.590 | | | |
| | d17 = 2.500 | N10 = 1.80518 | ν10 = 25.43 |
| r18 = 109.876 | | | |
| | d18 = 4.467 | | |
| r19 = −117.806 | | | |
| | d19 = 4.644 | N11 = 1.62041 | ν11 = 60.29 |
| r20 = −34.935 | | | |
| | d20 = 0.300 | | |
| r21 = 208.662 | | | |
| | d21 = 5.472 | N12 = 1.71300 | ν12 = 53.93 |
| r22 = −62.599 | | | |
| | d22 = 0.300 | | |
| r23 = 55.861 | | | |
| | d23 = 6.574 | N13 = 1.71700 | ν13 = 47.86 |
| r24 = −447.980 | | | |
| | d24 = 2.000 | | |
| r25 = ∞ | | | |
| | d25 = 28.000 | N14 = 1.51680 | ν14 = 64.20 |
| r26 = ∞ | | | |

2nd Embodiment f=21.0[T]~19.0[M]~17.5[W]
FNO=2.25[T]~2.00[W]
Condition (1):f1/fW=−1.58
Condition (2):f2/fW=2.35
Condition (3):f3/fW=4.10
Condition (4):f4/fW=2.04

| [Radius of Curvature] | [Axial Distance] | [Refractive Index] | [Abbe Number] |
|---|---|---|---|
| r1 = 42.996 | | | |
| | d1 = 2.500 | N1 = 1.61800 | ν1 = 63.39 |
| r2 = 18.000 | | | |
| | d2 = 7.639 | | |
| r3 = 31.040 | | | |
| | d3 = 2.500 | N2 = 1.52510 | ν2 = 56.38 |
| r4* = 16.454 | | | |
| | d4 = 6.939~9.267~11.411 | | |
| r5 = −182.344 | | | |
| | d5 = 3.650 | N3 = 1.75000 | ν3 = 25.14 |
| r6 = −48.931 | | | |
| | d6 = 8.174 | | |
| r7 = 29.570 | | | |
| | d7 = 2.954 | N4 = 1.75000 | ν4 = 25.14 |
| r8 = 62.412 | | | |
| | d8 = 2.669~5.005~6.464 | | |
| r9 = ∞(SP) | | | |
| | d9 = 4.500 | | |
| r10 = 335.161 | | | |
| | d10 = 2.500 | N5 = 1.75000 | ν5 = 25.14 |
| r11 = 29.305 | | | |
| | d11 = 5.045 | N6 = 1.69350 | ν6 = 50.29 |
| r12 = −50.749 | | | |
| | d12 = 11.070~6.405~2.803 | | |
| r13 = −31.930 | | | |
| | d13 = 2.500 | N7 = 1.75000 | ν7 = 25.14 |
| r14 = 50.847 | | | |
| | d14 = 3.344 | | |
| r15 = −162.133 | | | |
| | d15 = 5.384 | N8 = 1.61800 | ν8 = 63.39 |
| r16 = −30.112 | | | |
| | d16 = 0.300 | | |
| r17 = 608.239 | | | |
| | d17 = 4.998 | N9 = 1.61800 | ν9 = 63.39 |
| r18 = −56.155 | | | |
| | d18 = 0.300 | | |
| r19 = 44.903 | | | |
| | d19 = 6.034 | N10 = 1.75450 | ν10 = 51.57 |
| r20 = −184.680 | | | |
| | d20 = 2.000 | | |
| r21 = ∞ | | | |
| | d21 = 28.000 | N11 = 1.51680 | ν11 = 64.20 |
| r22 = ∞ | | | |

[Aspherical data of 4th surface (r4)]
$\epsilon = -0.60506 \times 10^{-1}$
$A4 = 0.53927 \times 10^{-5}$
$A6 = -0.53237 \times 10^{-7}$
$A8 = 0.46953 \times 10^{-10}$
$A10 = -0.44854 \times 10^{-12}$ As described above, according to the zoom lens systems of the above-described embodiments, since the negative stationary lens unit is disposed on the most enlargement side and no negative movable lens unit is included, high performance and size reduction are achieved for zoom lens Systems.

While the cases of the four-unit zoom lens systems of negative, positive, positive, positive configuration are shown in the concrete embodiments, the gist of the present invention is not limited thereto. Addition of a stationary lens unit having weak positive or negative optical power or a negative stationary lens unit as a lens unit succeeding the first lens unit does not depart from the gist of the present invention.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. A zoom lens system comprising from an enlargement side to a reduction side:
    a first lens unit having a negative optical power and being stationary in zooming;
    a second lens unit having a positive optical power;
    a third lens unit having a positive optical power; and
    a fourth lens unit having a positive optical power;
    wherein said fourth lens unit satisfies the following condition:

$$1.0 < f4/fW < 2.2$$

wherein fW is the overall focal length of the zoom lens system at the wide-angle limit, and f4 is the focal length of the fourth lens unit.

2. A zoom lens system as claimed in claim 1, wherein said first lens unit satisfies the following condition:

$$-2.0 < f1/fW < -1.1$$

wherein fW is the overall focal length of the zoom lens system at the wide-angle limit, and
    f1 is the focal length of the first lens unit.

3. A zoom lens system as claimed in claim 1, wherein said second lens unit satisfies the following condition:

$$1.5 < f2/fW < 2.7$$

wherein fW is the overall focal length of the zoom lens system at the wide-angle limit, and
    f2 is the focal length of the second lens unit.

4. A zoom lens system as claimed in claim 1, wherein said third lens unit satisfies the following condition:

$$2 < f3/fW < 6$$

wherein fW is the overall focal length of the zoom lens system at the wide-angle limit, and
    f3 is the focal length of the third lens unit.

5. A zoom lens system as claimed in claim 1, wherein said first lens unit is moved in focusing.

6. A zoom lens system as claimed in claim 1, wherein said first lens unit includes an aspherical surface.

7. A zoom lens system as claimed in claim 1, wherein said fourth lens unit includes an aspherical surface.

8. A projector comprising:
    a zoom lens system for use as a projection optical system of a projector; and
    a display device for displaying an image to be projected;
        said zoom lens system comprising from an enlargement side to a reduction side:
        a first lens unit having a negative optical power;
        a second lens unit having a positive optical power;
        a third lens unit having a positive optical power; and
        a fourth lens unit having a positive optical power;
        wherein the first lens unit is stationary in zooming, wherein the first lens unit is moved in focusing,
wherein the second lens unit and the third lens unit are moved along an optical axis in the same direction in zooming, and
wherein the fourth lens unit satisfies the following condition:

$$1.0 < f4/fW < 2.2;$$

where fW is the overall focal length of the zoom lens system at the wide-angle limit, and f4 is the focal length of the fourth lens unit.

9. A projector in accordance with claim 8, wherein the first lens unit satisfies the following condition:

$$-2.0 < f1/fw < -1.1$$

wherein fw is the overall focal length of the zoom lens system at the wide-angle limit, and wherein f1 is the focal length of the first lens unit.

10. A projector in accordance with claim 8, wherein the second lens unit satisfies the following condition:

$$1.5 < f2/fw < 2.7$$

wherein fw is the overall focal length of the zoom lens system at the wide-angle limit, and wherein f2 is the focal length of the second lens unit.

11. A projector in accordance with claim 8, wherein the third lens unit satisfies the following condition:

$$2 < f3/fw < 6$$

wherein fw is the overall focal length of the zoom lens system at the wide-angle limit, and wherein f3 is the focal length of the third lens unit.

12. A projector in accordance with claim 8, which further comprises a dicroic prism disposed between the fourth lens unit and the display device.

13. A zoom lens system for use as a projection optical system of a projector comprising from an enlargement side to a reduction side:

a first lens unit having a negative optical power;
a second lens unit having a positive optical power;
a third lens unit having a positive optical power; and
a fourth lens unit having a positive optical power;
wherein the first lens unit is stationary in zooming, and
wherein the fourth lens unit satisfies the following condition:

$$1.0 < f4/fW < 2.2$$

wherein fW is the overall focal length of the zoom lens system at the wide-angle limit, and wherein f4 is the focal length of the fourth lens unit.

14. A zoom lens system in accordance with claim 13, wherein the first lens unit satisfies the following condition:

$$-2.0 < f1/fw < -1.1$$

wherein fw is the overall focal length of the zoom lens system at the wide-angle limit, and wherein f1 is the focal length of the first lens unit.

15. A zoom lens system in accordance with claim 13, wherein the second lens unit satisfies the following condition:

$$1.5 < f2/fw < 2.7$$

wherein fw is the overall focal length of the zoom lens system at the wide-angle limit, and wherein f2 is the focal length of the second lens unit.

16. A zoom lens system in accordance with claim 13, wherein the third lens unit satisfies the following condition:

$$2 < f3/fw < 6$$

wherein fw is the overall focal length of the zoom lens system at the wide-angle limit, and wherein f3 is the focal length of the third lens unit.

17. A zoom lens system in accordance with claim 13, wherein the first lens unit is moving in focusing.

18. A zoom lens system in accordance with claim 13, wherein the first lens unit includes an aspherical surface.

19. A zoom lens system in accordance with claim 13, wherein the fourth lens unit includes an aspherical surface.

* * * * *